Aug. 10, 1965  A. B. HASLACHER  3,199,767
IMPERVIOUS BAG AND METHOD OF MAKING SAME
Original Filed Nov. 25, 1959  7 Sheets-Sheet 5

INVENTOR.
ALFRED B. HASLACHER, DECEASED
BY ROBERT L. HASLACHER, ADMINISTRATOR
BY
Bialos + Schlemmer
Attorneys

FIG_14

FIG_15A

FIG_15A

FIG_15B

FIG_15B

FIG_15C

INVENTOR.
ALFRED B. HASLACHER, DECEASED
BY ROBERT L. HASLACHER, ADMINISTRATOR
BY
Bialos + Schlemmer
Attorneys United States Patent Office
3,199,767
Patented Aug. 10, 1965

1

3,199,767
IMPERVIOUS BAG AND METHOD OF
MAKING SAME
Alfred B. Haslacher, deceased, late of San Francisco,
Calif., by Robert L. Haslacher, administrator, Palo
Alto, Calif., assignor to Mabel L. Haslacher
Original application Nov. 25, 1959, Ser. No. 855,467.
Divided and this application Jan. 18, 1963, Ser. No.
252,462
14 Claims. (Cl. 229—60)

This application is a divisional application and continuation-in-part of application Serial No. 855,467, filed November 25, 1959, now abandoned, and which in turn was a continuation-in-part of now abandoned application, Serial No. 651,647, filed April 9, 1957.

This invention relates to bags, and to a method for sealing bags constructed of materials highly resistant to the passage of moisture and gases. Such bags, when adequately sealed, are moisture proof and may be evacuated to place the contents under vacuum, or filled with inert gases to provide a desired atmosphere for the contents. The contents of the bag may be sterilized by radiation or the like and the bag will maintain the contents in a sterile condition.

The present invention is particularly concerned with effectively sealing an end closure or bottom of the so-called automatic or satchel bottom type of the general character set forth in applicant's Patents 2,353,402, 2,709,549 and 2,537,462. As pointed out therein, the bag is fabricated from a section of tube which may have one or more walls, but which is in any event provided with at least an inside surface of heat sealable thermoplastic material. The end or bottom of the bag preferably is constructed by slitting the tube material and folding the sides inwardly to provide what is known as a "diamond fold." Such construction provides outwardly extending, generally triangular flaps having confronting, overlapping edges running the width of the bag bottom. To effectively seal this type of bag bottom, it is necessary to seal the inner flap edges together along their length across the middle of the bag and then to seal the sides of the bag bottom to the adjacent walls of the bag. In this manner, the side seals cross the sealed flap edges and render the bag gas and moisture proof.

It is a general object of the invention to provide a method for sealing the ends of impervious bags which will rapidly and consistently provide seals in the bag of a nature rendering such seals moisture and gas proof, and to provide an improved impervious sealed bag bottom.

Another object of the invention is to provide an improved method for sealing bag bottoms having either a fin seam or overlap seam in joining the diamond fold flap edges.

A further object of the invention is to provide a bead thermoplastic-lined, satchel-bottom bag having a bead or line of thermoplastic adhesive material positioned to ensure complete hermetic sealing thereof by preventing wicking through the end of an inner flap of the sealed flap edges, and to a method of applying such bead.

The invention includes other objects and features of advantages, some of which, together with the foregoing, will appear hereinafter wherein is further set forth the preferred manner of constructing the apparatus of the present invention.

2

In the drawings accompanying and forming a part hereof.

The apparatus consists essentially of a conveyor means, for transporting the bags along a predetermined path of movement through the machine, and heat sealing means positioned in such path of movement and adapted for forming moisture and gas impervious seals in locations assuring complete sealing of the bag end. The apparatus as here shown and described is designed to seal the bottom closure of a bag of the "automatic" opening or "satchel" type such as disclosed in applicant's aforesaid Patents 2,353,402, 2,709,549 and 2,537,462. A bag 22 of the automatic type is illustrated in the accompanying drawings in various of its locations and positions along the length of the apparatus. As will be understood, the apparatus is constructed to function equally well with single or multiple wall bags, so long as the inside wall either consists of or is coated with a thermoplastic material which is highly resistant to the passage of moisture or gas therethrough.

As here shown, the bag 22 is of double wall construction and is fabricated from inner and outer paper tubes, with the inner tube being coated with a thermoplastic material. It will be appreciated that the material of the tubes may be of any suitable flexible sheet material known to the bag making art, paper here being chosen for strength and economy, and the thermoplastic material of the inside surface may be in the form of a separate tube or of a coating in the inner tube. The bag 22, as delivered to the present apparatus, has been prepared for the formation of the automatic bottom by forming slits defining end tabs 24 and 26 and by bringing opposite edges of the tube together so as to provide a diamond fold. Folding in this manner provides outwardly extending generally triangular flaps 28 and 30 terminating at their apexes in the tabs 24 and 26, respectively. The distance between the lines 32 and 34, about which the flaps are folded, is in such relation to the width of the tube that the edges 36 and 38 of the flaps 28 and 30 are in confronting overlapping relation for eventual sealing in either an overlap or fin seam.

In sealing the bag bottom, the flap edges 36 and 38 are sealed together along their length so as to provide a continuous seam from the tab end of flap 28 to the tab end of flap 30. For this purpose, the apparatus includes a conveyor 40 adapted to transport the bag in a path of movement parallel to the flap edges 36 and 38, and a heat sealing device 52 having a heating element 44 positioned in such path of movement for bonding the flap edges together along their length as the bag moves past the element 44.

Figure 1:
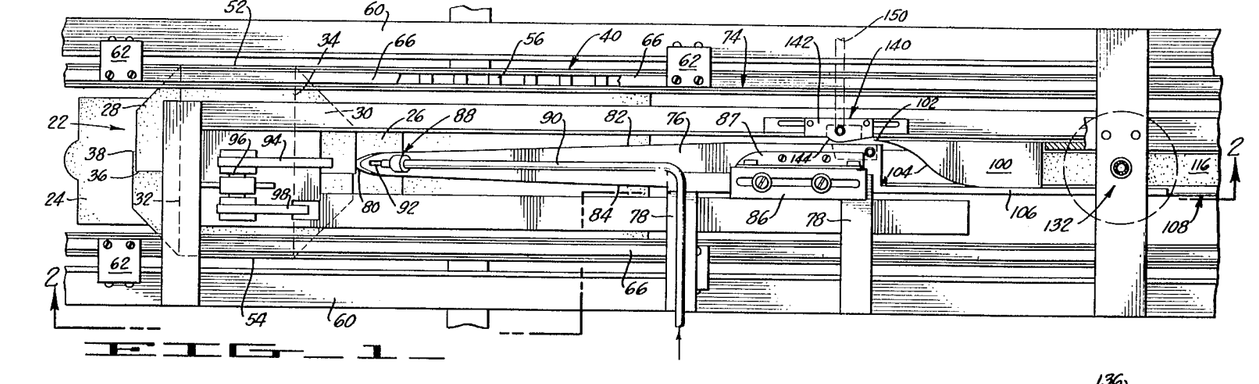
FIGURE 1 is a plan view of a portion of an apparatus constructed to manufacture bags in accordance with the present invention.
Figure 2:
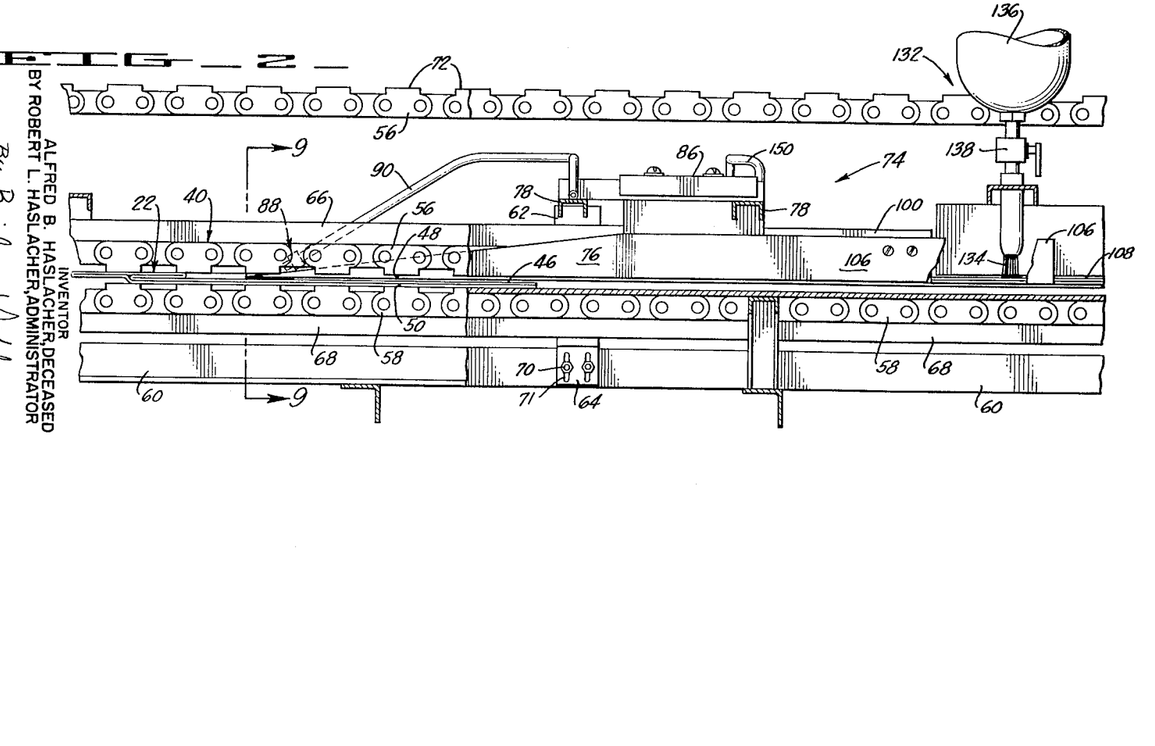
FIGURE 2 is a longitudinal sectional view of the apparatus and is taken substantially on the plane of line 2—2 of FIGURE 1.
Figure 3:
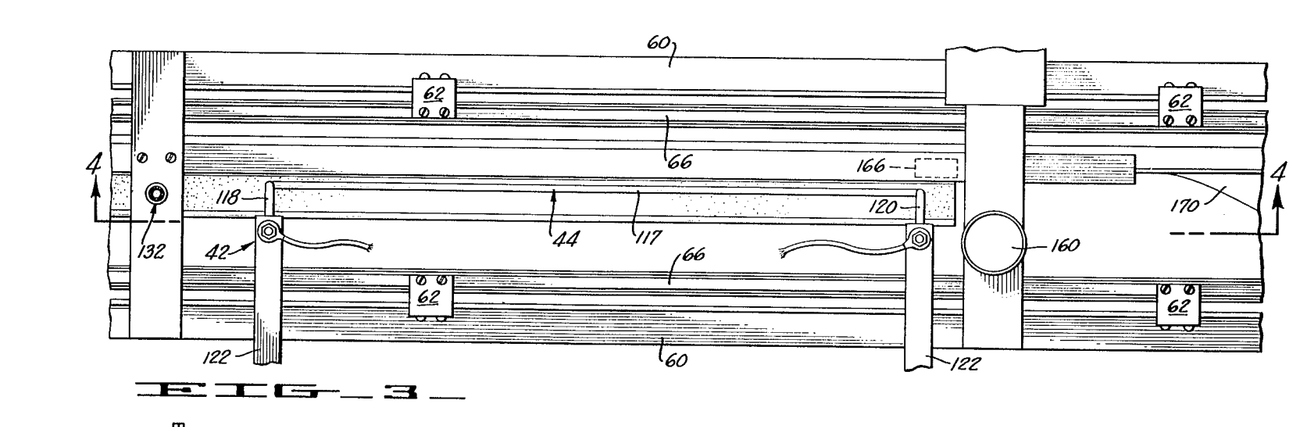
FIGURE 3 is a plan view of a portion of the apparatus contiguous to the portion of FIGURE 1.
Figure 4:
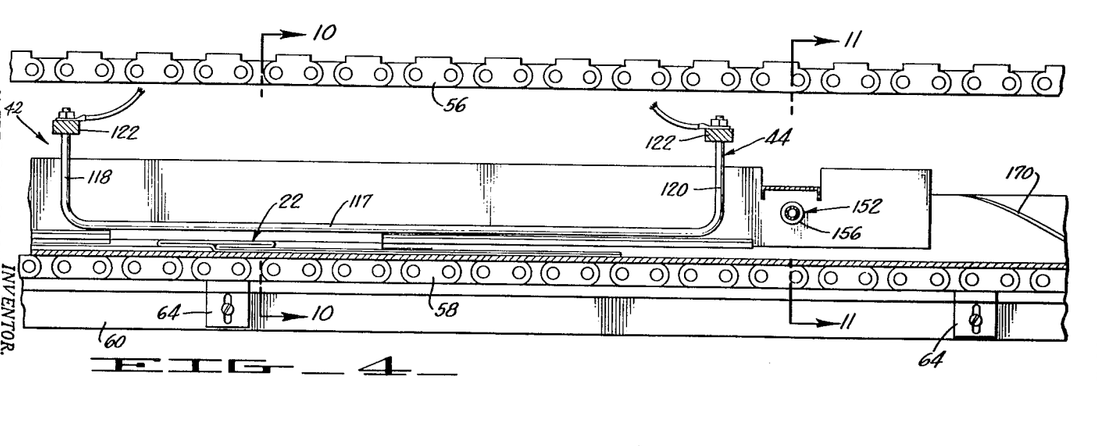
FIGURE 4 is a longitudinal sectional view taken substantially on the line 4—4 of FIGURE 3.

The conveyor 40 may be of any suitable form, but it is noted that the bags are normally received from the forming machine in successive order with the body 46 of the bag gusseted and folded flat as shown in FIGURES 1 and 2. Therefore, the conveyor 40 preferably should be able to receive the bags in this condition and advance them in successive order through the apparatus past the various forming and sealing devices. Such a conveyor may consist basically of spaced gripping elements 48 and 50 formed to engage the lateral edges 52 and 54 of the bag bottom for transporting the bags through the apparatus. As shown in the drawings, the conveyor 40 includes laterally spaced pairs of roller chains 56 and 58, with each chain loop in a pair being mounted in coplanar tangential relation to the other. In this construction, the bag edges 52 and 54 are engaged between gripping elements 48 and 50 provided by the chains 56 and 58 themselves. A frame having longitudinal members 60 is provided for supporting the conveyor and associated devices. Mounted on frame member 60 are a plurality of brackets 62 and 64 to which are affixed guide rails 66 and 68. Preferably, the brackets 62 and 64 are connected to the frame members 60 by means of bolts 70 engaged through slots 71 in the brackets so as to permit relative vertical adjustment of the guide rails 66 and 68. These rails serve to guide and position the chains 56 and 58 with respect to each other, and, by reason of the vertical adjustment provision, thus control the vertical spacing of the chains and hence the gripping pressure exerted on the bags 22. It will be noted that the chains 56 and 58 may be provided with links having bent over bosses 72 arranged to engage the bags 22, and if desired a pad of resilient material such as rubber may be attached to the bosses.

Figure 9:
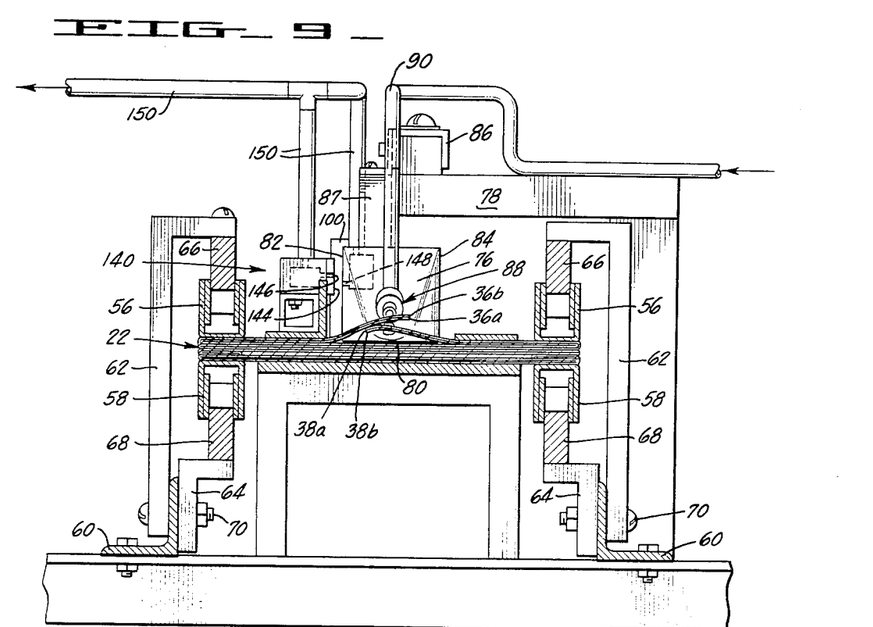
FIGURE 9 is an enlarged cross-sectional view taken substantially on the plane of line 9—9 of FIGURE 2.

With the bags 22 gripped securely between the gripping elements 48 and 50 of conveyor 40, as shown in FIGURES 1 and 2, the bags are advanced in a path of movement parallel to the flap edges 36 and 38. In the form shown in FIGURES 1-6, 10 and 11 of the drawings, the flap edges 36 and 38 are interleaved before being thermally sealed into a seam. The interleaving is accomplished by means 74 positioned in the path of movement of the flap edges and adapted to rearrange the flap edges of multiple wall bags so that the inner flap edge of one side will overlie the inner flap edge of the other side, for bonding of such edges together. As may best be seen from FIGURE 9 of the drawings, the bags 22 are delivered into the present apparatus with the inner and outer flap edges 36a and 36b overlying the inner and outer flap edges 38a and 38b. To bring the inner flap edges 36a and 38a into contact it is necessary to, in effect, interleave the flap edges. This interleaving is here accomplished by a generally wedge-shaped plow member 76 supported above the bag 22 by brackets 78 and having a sharpened leading edge 80 terminating in a blunt pointed portion sloping upwardly from the edge, and is thus formed, and positioned to pass or engage between the flap edges 36 and 38 and the balance of the bag, in the manner shown in FIGURE 9, as the bag is carried along by the conveyor 40. Further progress of the bag along the member 76 will continue to lift the flap edges 36 and 38 until they assume an erect position on the opposite sides 82 and 84 of the plow member 76.

To make the apparatus adjustable to different sizes and types of bags, the plow member 76 is connected to the brackets 78 by vertically and longitudinally adjustable members 86 and 87 so as to permit precise positioning of the plow member for the particular type and size of bag to be encountered. The sprockets 89, upon which chain loops 56 and 58 travel, are also laterally adjustable on their shafts so as to be adjustable to different width bag bottoms.

Figures 12, 13:
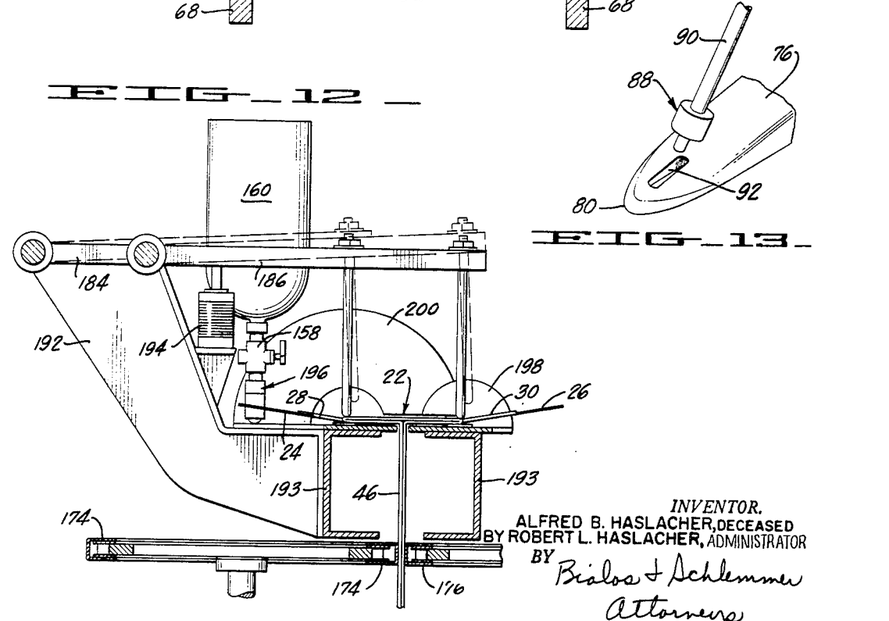
FIGURE 12 is a cross-sectional view taken substantially on the plane of line 12—12 of FIGURE 7.
FIGURE 13 is an enlarged fragmentary perspective view of a flap opening portion of the apparatus.

With certain types of bags, insertion of the sharpened edge 80 between the bag and the flap edges 36 and 38 may prove difficult. Means 88 is therefore provided for urging the flap edges upwardly from the bag just before such insertion. This means consists of a tube 90 connected to a source of air under pressure (not shown) and mounted above the plow member 76 in position to direct a blast of air downwardly and forwardly of the sharpened edge 80. For this purpose, the edge 80, as may be seen in FIGURE 13, is formed with a passage 92 therethrough comparable to the eye of a needle, and the tube 90 is arranged to project its air blast downwardly and forwardly through such passage to the underside of the plow. A further aid in effecting the preliminary opening of the flap edges is afforded by a finger 94 mounted on a shaft 96 supported above the plane of the bag 22 and biased to press down on the flap edges 36 and 38 ahead of the plow member leading edge 80. A second finger 98 is secured to shaft 96 and is formed to be engaged and deflected upwardly by flap 30 of the bag just before the flap edges 36 and 38 encounter the plow member 76. In this manner, the flap edges are held down until they reach the precise position where it is desired that the air blast become effective. This results in a more positive and foolproof opening than would be possible without the fingers 94 and 98.

When the flap edges 36 and 38 are in fully erect position, the apparatus of FIGURES 1-6, 10 and 11 returns first one and then the other of the inner flaps 36a and 38a to a down position generally coplanar with the flaps 28 and 30. As here shown, this is accomplished by a plow member 100 having a sharpened leading edge 102 and a curved portion 104 adapted to engage and deflect the inner flap edge 36a back down to the plane of the bottom of the bag 22. An extension 106 on plow member 76 projects rearwardly of plow member 100 and serves to keep flap edges 38a and 38b in their erect position until flap edge 36a is down. As flap edges 38 and 38b pass beyond extension 106, they return to their down position by reason of the natural resiliency of the bag material aided by gravity. Preferably, flap edges 38a and 38b have been previously fastened together by the preceding bag forming machine. Of course, it will be understood that a plow member similar to but acting oppositely to plow member 100 may be utilized if desired.

As the flap edge 36a is returned to its down position, it comes to bear on a supporting strip 108 which is to prevent blocking and which is attached to the plow member 76 and extends rearwardly therefrom along the path of movement of the bag. The shape of strip 108 may best be seen in FIGURE 10 wherein it is shown with flap edge 36a and overlapping flap edges 38a and 38b resting upon it. The strip 108 extends the length of the heating element 44 and preferably is of hollow construction so as to provide a lengthwise passage 110 through which a cooling fluid may be circulated if desired. As shown, the strip 108 may be formed of a flat plate 112 having upwardly and inwardly curved edges gripping a convexly curved plate 114. To reduce frictional resistance during high speed operation, a layer 116 of plastic (e.g., "Teflon," a tetrafluoroethylene polymer) may be secured to the upper surface of plate 114. Heating element 44 may be of any suitable type such as heated bars, gas, wheels, belts, or electronic means, as described in applicant's Patent No. 2,709,549. However, for high speed operations, a bar type is preferred such as the circular cross section bar 117 illustrated in FIGURES 3, 4 and 10. Bar 117 is preferably of U-shape with its ends 118 and 120 bent up and attached to supporting arms 122 pivotally supported on a shaft 124 carried by brackets 126 attached to the frame member 60. As a safety feature, it is desired that the heating element 44 be lifted from contact with the bag material should the conveyor 40 stop. This is here accomplished by means of a solenoid 128 carried on bracket 126 and having its core member 130 connected with one of the arms 122. The solenoid core member 130 is normally biased to an upwardly extended position pushing the heating element bar 117 up from the path of the bag 22. When the solenoid is energized, the core member 130 retracts and urges the bar 116 down to the position shown. By connecting the solenoid in the power circuit to the conveyor drive, it will be seen that stoppage of such power will immediately cause the bar 117 to spring upwardly, thus preventing scorching or igniting of the bag material.

As an important feature of the present invention, the apparatus is adapted to provide a complete thermoplastic-to-thermoplastic seal even in bags fabricated from non-thermoplastic material. A consideration of FIGURE 10 of the drawings will show that overlapping of the inner flap edges 36a and 38a will result, in coated bags, in the thermoplastic inner surface of flap edge 38a contacting the outer uncoated surface of flap edge 36a in the case the ply is formed of paper, for example, coated with the thermoplastic material on the inside. Upon application of the heating element 44, the flap edges 36a and 38a will bond together in some instances and form a seal which is adequate for some purposes. However, such seal is not impervious because moisture and gases can wick or travel through the end of the paper of flap 36a. Accordingly, means 132 is provided for applying a coating of a quick-setting thermoplastic adhesive material to the outer surface and extreme edge or end of flap edge 36a prior to the folding down of flap edge 38a into contact therewith. The means 132 is located between the plow member 100 and the end of the extension 106 on member 76, and, as shown in FIGURE 2, consists of a brush 134 positioned to engage the upper surface and extreme edge of flap edge 36a and provided with a heated reservoir 136 for the quick-setting thermoplastic liquid. A valve 138 is connected between the brush 134 and reservoir 136 for regulating the flow of thermoplastic liquid to an amount sufficient to coat the upper surface of flap edge 36a and to thoroughly saturate its extreme edge so as to provide tiny beads of additional thermoplastic material therealong. The reason for this beading will become apparent subsequently in the portion of the specification dealing with further heat sealing.

When a multi-walled bag is being sealed along the flap edges 36 and 38, it is necessary to retain the outer flap edge 36b in its erect position until the heat sealing has been accomplished. For this purpose, means 140 is provided for separating flap edges 36a and 36b before they encounter plow member 100 so they will pass on opposite sides thereof with flap edge 36a being folded down in the manner described while flap edge 36b remains in erect position. Means 140 includes a member 142 having a face 144 curving into proximity to plow members 76, leaving a narrow space therebetween for flap edges 36a and 36b. Formed in face 144 and the confronting portion of plow member 76 are longitudinally extending slots 146 and 148 to which suction is applied through tubing 150. The suction pulls the flap edge 36a against plow member 76 and the flap edge 36b against face 144, thus effectively separating such flap edges for passage on opposite sides of plow member 100.

Figure 10:
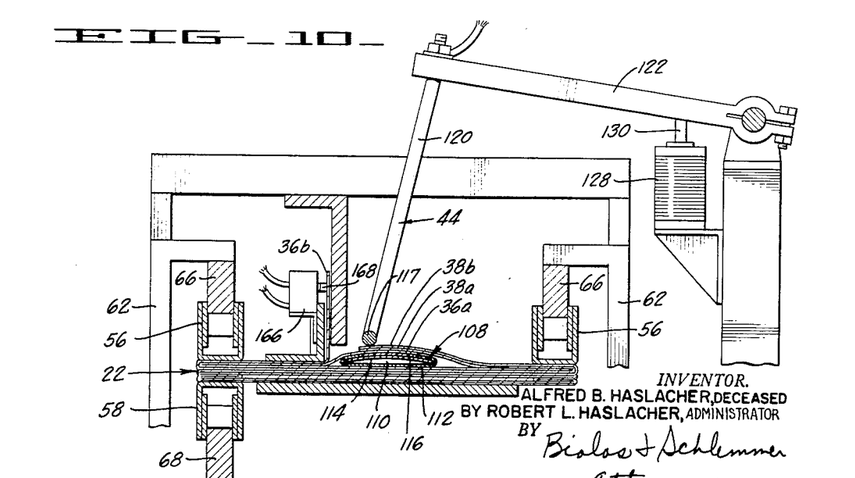
FIGURE 10 is an enlarged cross-sectional view taken substantially on the plane of line 10—10 of FIGURE 4.
Figure 11:
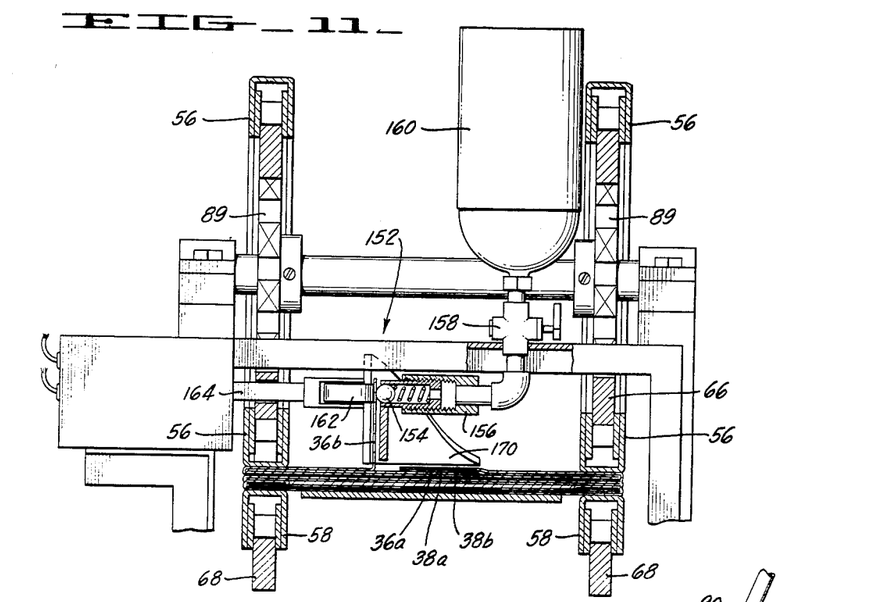
FIGURE 11 is an enlarged cross-sectional view taken substantially on the plane of line 11—11 of FIGURE 4.

After sealing of flap edges 36a and 38a together, the outer flap edge 36b is pressed down into overlapping relation therewith. To secure flap edge 36b in such position, and to add strength to the seam, means 152 is provided for applying adhesive such as glue between the inner surface of flap edge 36b and the outer surface of flap edge 38b. The adhesive may be applied to either flap edge, but in the apparatus here shown it is applied to flap edge 36b. As shown in FIGURE 11 of the drawings, the glue applicator preferably includes a spring loaded ball 154 mounted in a tubular housing 156 which communicates through a valve 158 with an adhesive reservoir 160. The ball 154 is formed to apply a strip of adhesive to the inside surface of flap edge 36b and is positioned so as to locate such strip near the extreme edge thereof. To insure that the applicator functions only when a flap edge 36b is in correct position, a backing wheel 162 is mounted on a solenoid arm 164 and arranged, when the latter is extended, to press the flap edge against the ball 154, displacing the ball slightly and permitting the adhesive to flow. The solenoid is formed so that the arm 164 is extended only when the solenoid is deenergized. The circuit to the solenoid passes through a microswitch 166 (see FIGURE 10) having a feeler 168 which will open the circuit when contacted by the flap edge 36b. A plow member 170 is mounted in the path of movement of flap edge 36b behind the means 152 and serves to press the glue coated flap edge 36b firmly onto the other flap edges.

It will be noted that, desirably, and as here shown, the strip of adhesive is placed near the edge of flap edge 36b and the heat sealed seam is near the edge of flap edge 36b (see FIGURE 10) so that the seals or joints are offset. This construction permits a flat overlapping and avoids pressing the adhesive strip down over the heat seal while the latter is still warm. It will be appreciated, however, that the adhesive may overlie or overlap the heat seal without departing from the spirit or scope of the invention.

Figure 14:
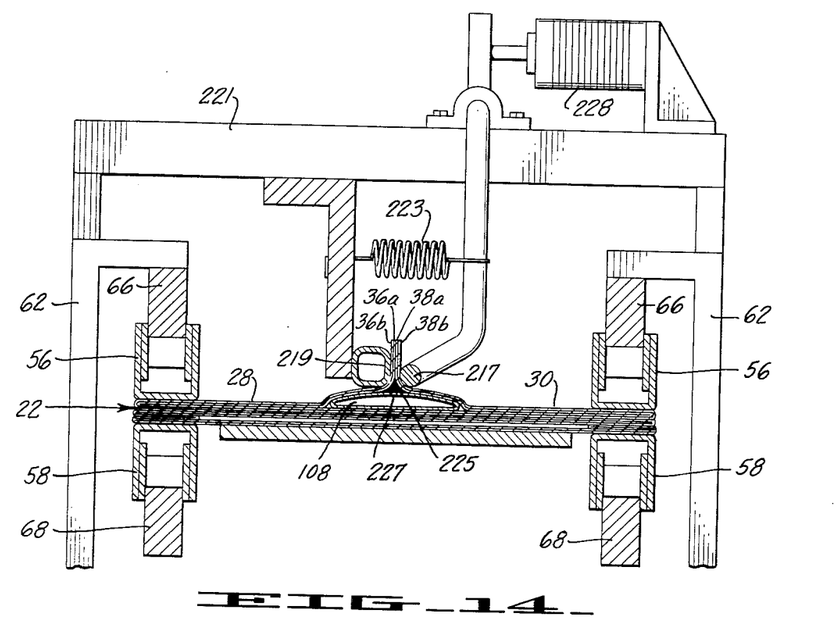
FIGURE 14 is a cross-sectional view taken similarly to that of FIGURE 10, but illustrating a modified form of the invention adapted for forming a fin seam.

A modified form of the present invention is illustrated in FIGURE 14 of the drawings. In this modification, a fin seam, rather than the described overlapping seam, is formed. For this purpose, the heat sealing means is rearranged upon the frame members 62, while the other portions of the machine remain substantially the same.

The fin seam is formed by bending the flap edges 36 and 38 upwardly, at right angles to the plane of the flaps 28 and 30, and bonding the confronting inner faces together. Since the inner faces are composed of thermoplastic material, they may be bonded by heat sealing. After being displaced to erect position by the plow member 76, the flap edges are heat sealed together by a heating bar 217 pressing the flap edges against an anvil 219. Heating bar 217 is similar in construction to the bar 117 illustrated in FIGURE 10, but is pivotally supported on transverse frame member 221 for substantially horizontal swinging movement toward and away from anvil 219. A spring 223 normally urges the bar 217 toward anvil 219. A solenoid 228, actuated in the same manner as solenoid 128 of FIGURE 10 is provided for retracting the bar 217 should the power to the conveyor drive fail.

As an important feature of the invention, a bead 225 of thermoplastic material is deposited along the crevice or crotch formed at the base of the fin seam. This head 225 provides for complete hermetic sealing of the bag bottom in a manner which will become apparent subsequently in the portion of the specification dealing with further heat sealing. As shown in FIGURE 14 of the drawings, the bead 225 may be provided by utilizing the hollow supporting strip 108 as a conduit for a quick-setting thermoplastic liquid from a suitable reservoir (not shown). An opening 227 through the upper wall of strip 108 allows the liquid to flow into the crevice at the base of the fin seam and, in effect, form a bead or fillet thereat. The bead of thermoplastic material can be applied in other ways, as will be apparent to those skilled in the art.

Figure 15A:
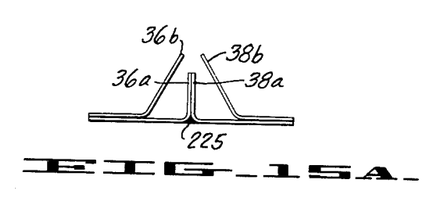
FIGURE 15A is a fragmentary schematic view showing the initial step in forming a combination interleaved and fin seam.
Figure 15B:
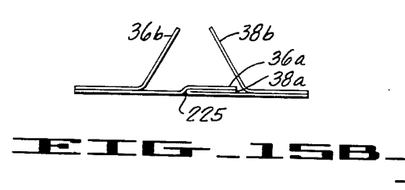
FIGURE 15B is a view similar to that of FIGURE 15A and showing the next step.
Figure 15C:
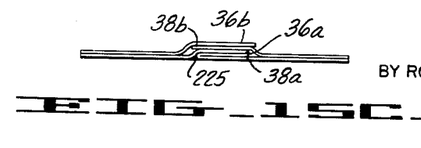
FIGURE 15C is a view similar to that of FIGURE 15B and showing the final step.

The fin seam is thus flattened down by suitable plow members (not shown) similar to plow member 100 of FIGURE 1. These plow members may be arranged to produce a combination fin and overlapped seam in the manner schematically illustrated in FIGURE 15A, 15B and 15C of the drawings. In this seam, the flap edges 36a and 38a are not secured to the adjacent flap edges 36b and 38b during forming of the bag. After heat sealing the seam and depositing the bead 223, as shown in FIGURE 14, the flap edges assume the position shown in FIGURE 15A. The fin seam formed by the inner flap edges 36b and 38b is pressed flat as shown in FIGURE 15B. The outer flap leaves are then coated with adhesive and pressed into interleaved relation, as shown in FIGURE 15C. The adhesive may be pplied by means similar to means 152, of FIGURE 11. This combined interleaved and fin seam is preferred where the bag material is fairly thick.

Figure 16A:
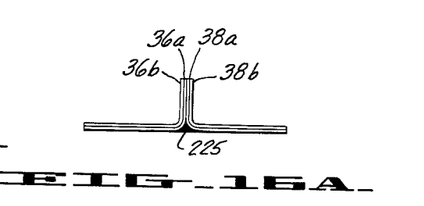
FIGURE 16A is a view similar to that of FIGURE 15A but showing the initial step of forming a straight fin seam.
Figure 16B:
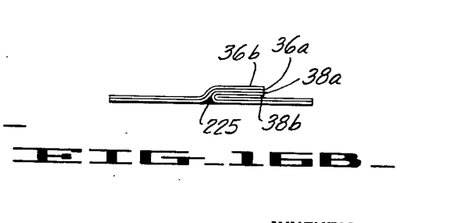
FIGURE 16B is a view similar to that of FIGURE 16A and showing completion of the seam.

In bags having material of thinner wall thickness, the fin seam may be simply bent over and pressed flat. As shown in FIGURES 16A and 16B, the flap edges 36a and 38a are secured to adjoining flap edges 36b and 38b. After heat sealing of the seam, and placement of the bead 225, the fin seam is turned down into the plane of the bag bottom by a suitable plow member of the type shown at 100 in FIGURE 1.

The "automatic" opening bag bottom requires further sealing to be completely impervious. As shown in applicant's Patent No. 2,709,549, such sealing may be accomplished by providing heat seals at right angles to the flap edges 36 and 38 along the fold lines 32 and 34 which seal the flaps to the adjacent bag wall. Accordingly, the present apparatus includes a second conveyor 172 formed to transport the bags 22 along a second path of movement crosswise at right angles to the flap edges 36 and 38 and hence at right angles to their first path of movement. In the embodiment illustrated, this is accomplished by a second conveyor at right angles to the first conveyor, although it is obvious that the bag itself might be turned through 90° at the end of the first conveyor and both conveyors placed in line. The conveyor 172 is adapted to receive the bags from conveyor 40 and transport them through a heat sealing device 174 equipped to make the transverse seals.

Figure 6:
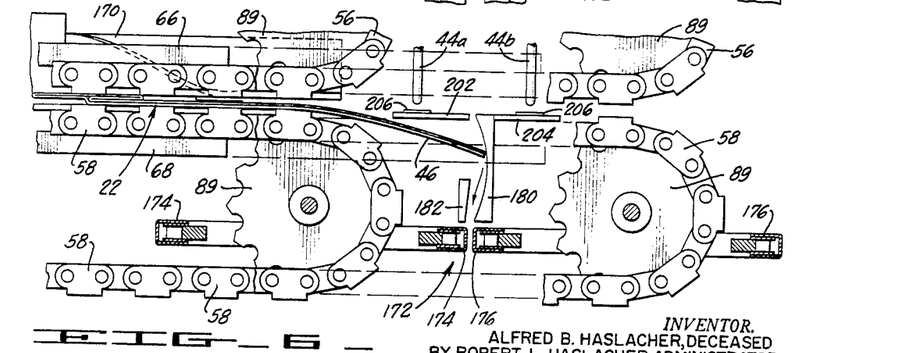
FIGURE 6 is a longitudinal sectional view taken substantially on the line 6—6 of FIGURE 5.
Figures 7, 8:
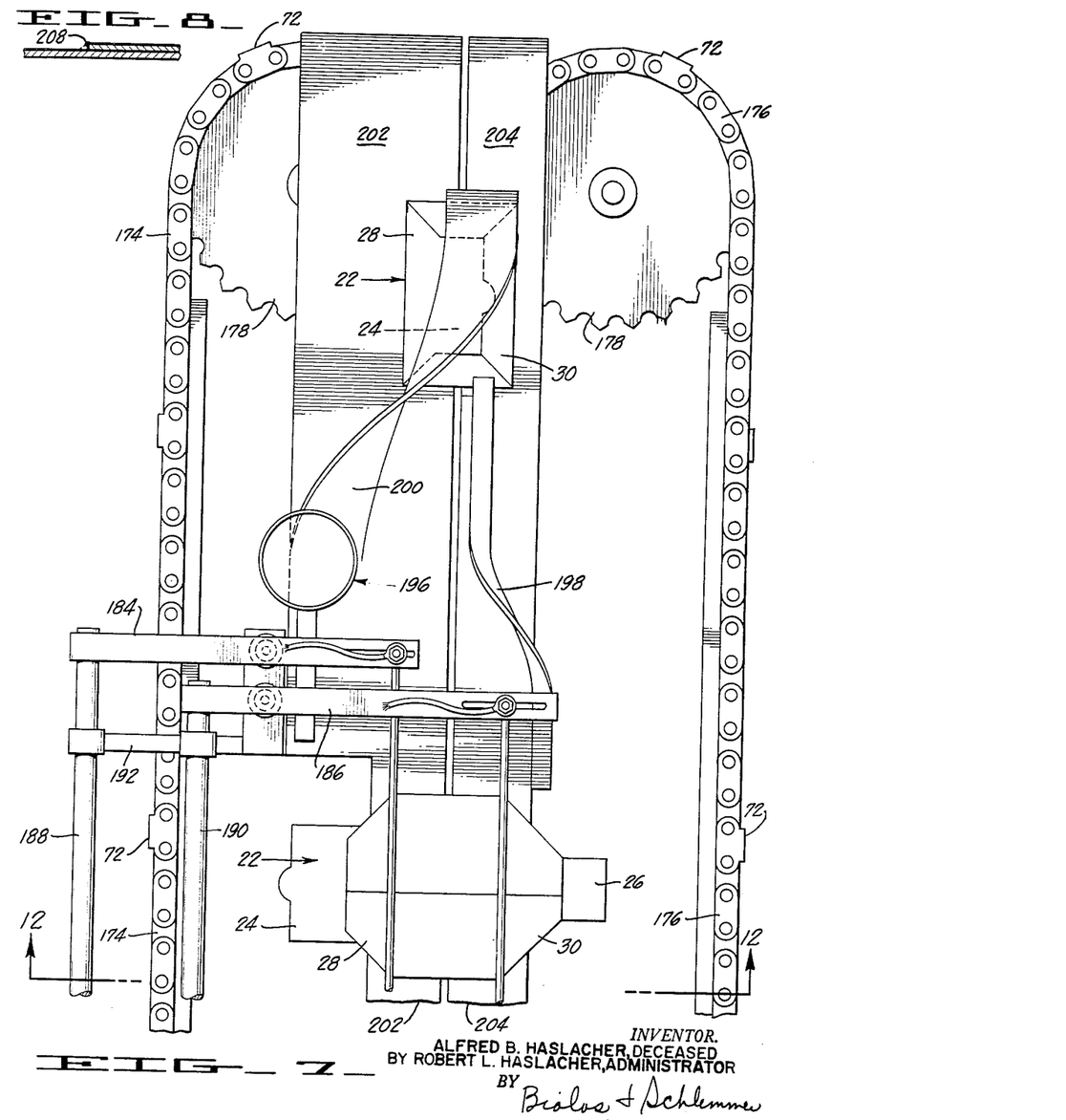
FIGURE 7 is a plan view of a portion of the apparatus contiguous to the portion of FIGURE 5.
FIGURE 8 is an enlarged fragmentary detail view of a portion of a seal formed at a stepdown point by the apparatus.

As may best be seen in FIGURES 6, 7 and 12 of the drawings, conveyor 172 includes gripping elements 174 and 176 provided by coplanar, tangentially arranged loops of roller chain entrained around suitable sprockets 178 and arranged to engage the body 46 of the bag. As previously described, the bag is folded flat and moves body foremost along the conveyor 40. As shown in FIGURE 6, the bag body 46 is preferably displaced to vertical position for gripping by conveyor 172 while the bag bottom remains sidably supported on plates 202 and 204, in its original plane. This is here accomplished by terminating the pair of chain loops 56 and 58 at one side of the conveyor 40 short of conveyor 172 and providing plates 180 and 182 formed to engage and deflect the bag body 46 to a vertical position between the chain loops 174 and 176. Preferably, links having bent over bosses 72 are positioned at spaced intervals along the chains 174 and 176 and the speed of the chains is timed so that the bosses 72 will not interfere with the displacement of the bag body 46 between the chains, but will immediately thereafter engage the bag body for transporting of the bag along the conveyor supporting plates 202 and 204.

The heat sealing device 174 preferably includes a pair of spaced apart heating elements 44a and 44b, each similar to element 44 provided in heat sealing device 42, the elements 44a and 44b being mounted on arms 184 and 186 journalled on shafts 188 and 190 supported on brackets 192 secured to frame members 193. Solenoids 194, similar in construction and function to solenoid 128 on heat sealing device 42, are mounted between the brackets 192 and arms 184 and 186 and serve to lift the heating elements 44 should the power go off. Preferably, a warming strip 206 is mounted subjacent to each of the elements 44a and 44b to aid in effecting the transverse heat seals. Strips 206 may be of high resistance metal connected to a suitable source of electrical current and should be insulated with a heat resistant material such as a ceramic.

Figure 5:
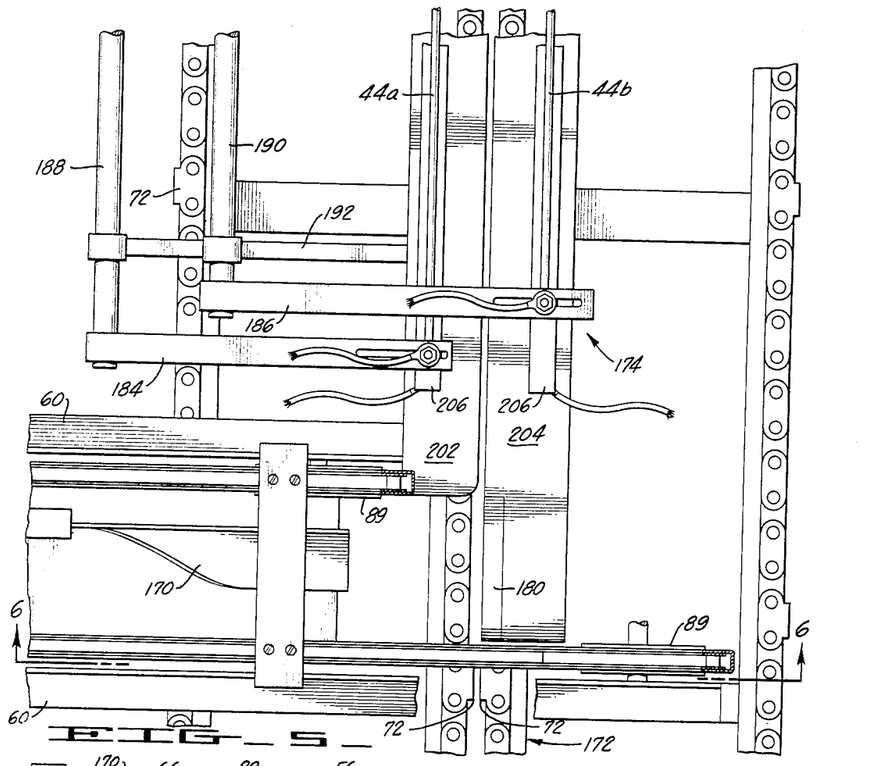
FIGURE 5 is a plan view of a portion of the apparatus contiguous to the portion of FIGURE 3.

The heating elements 44a and 44b may be adjusted to various positions, as is shown in FIGURE 5, to accommodate bags of different sizes. It will be noted that in both the embodiment illustrated wherein the crosswise second conveyor 172 is provided and in the embodiment wherein the bag can be turned through 90° as previously related, the successive bags are first moved in a direction parallel to the edges of the bottom seam, and then with said edges extending transversely or crosswise relative to the heating elements 44a and 44b which form the heat sealed cross seams. When the bag is thus turned 90°, the heat sealing elements 44a and 44b will be positioned parallel to the direction of movement of the second conveyor 172 which is in line with the first conveyor.

After the heat seals are formed along lines 32 and 34, the bag bottom is completed by folding into the form in which it appears in FIGURE 7. This is accomplished by first moving flap 30 inwardly into the plane of the bottom about the line 34 and then moving flap 28 about line 32 to the position shown. The flaps 28 and 30 are secured in this position and a suitable adhesive may be applied between them or they may be heat sealed. As here shown, glue or the like is applied to tab 24 on flap 28, by means of an applicator 196 similar to the previously described glue applicator means 152. Suitable plow members 198 and 200 are mounted upon the plates 202 and 204 over which the bag bottom slides and are formed to fold over flaps 30 and 28 in the manner described. The completed bag 22 is then taken from the end of conveyor 172 by any suitable device.

In the formation of the transverse heat seals along the lines 32 and 34, the aforementioned action of the quick-setting liquid thermoplastic coating means 132 in providing tiny beads 208 of thermoplastic material along the extreme edge of an inner flap edge 36a, in the interleaved seam shown in FIGURE 10, becomes important. As may be seen from FIGURE 8, the overlapping flap edges form a "stepdown," that is an abrupt transition from one level to another. While the amount of stepdown is tiny, a heat sealing element such as elements 44a and 44b passing over it is liable to leave a microscopically small opening which will prevent a complete hermetic seal and materially lessen the impervious qualities of the bag for some uses such as vacuum sealing. The beading of thermoplastic formed by means 132 softens as the heating element passes thereover and forms a wedge or ramp-shaped space which is completely filled with the thermoplastic material, thus providing an impervious seal at the stepdown point. Other portions of the bag in which a heat seal crosses a stepdown, such as at the overlapped portion of the tube forming the bag body, may be provided with thermoplastic beading of similar character so as to render the bag completely moisture impervious and gas tight. Further, by locating the tube seam so that it is close to the terminal edge of the first flap laid down, the stepdown can, in effect, be eliminated by the small space between the two, which space can be filled with the thermoplastic heat sealing material at the time of cross sealing, producing a bag capable of gas or vacuum pack. Preferably, said terminal edge of the flap is serrated.

The saturation of the edge of the flap, as heretofore described, prevents wicking.

A similar problem of obtaining a completed hermetic seal is encountered with bags having a fin seam of the character shown in FIGURES 14–16B. Here, the formation of the fin seam creates a tiny crevice along the base of the seam. The transverse heat seals are likely to leave a tiny triangular hole at this point. But the aforementioned bead 225 of thermoplastic material along the length of the crotch of the fin seam, in addition to reinforcing the heat seal, will melt sufficiently to close off the tiny hole and provide a complete impervious seal.

With respect to both of the described embodiments wherein the bead 225 is provided in the crotch of a fin type seam comprising flaps in surface to surface engagement, or along an end or edge of a flap of an inner overlapped type seam also comprising flaps in surface to surface engagement, the bead in either case extends lengthwise of the seam edges along a portion of what constitutes an inner part of the bag bottom. In other words, the bead is not exposed to or on any portion of the outer surface of the bag bottom along the previously explained "stepdown." Consequently, the bead does not offer impediment at the stepdown to the heat sealing elements 44a and 44b which form the cross seals. At the same time wicking from the interior is precluded, particularly in the overlapped seam embodiment in the case wherein the flaps include paper. Moreover, the bead of thermoplastic adhesive insures that no unsealed voids are left at the aforementioned "stepdown."

In all embodiments, any suitable material may be employed to provide the heat sealable inside bag surface, such as Pliofilm, free polyethylene film, or a polyethylene coating or film laminated to paper. The bead may also be of any suitable thermoplastic material, desirably of resinous character, such polyethylene extruded in molten state, or wax.

While the salient features of this invention have been described in detail with respect to certain embodiments thereof, it will of course be apparent that certain modifications may be made within the spirit and scope of this invention, and it is not desired therefore to limit the invention to the exact details shown except insofar as they may be defined in the following claims.

What is claimed is:

1. A bag comprising a length of flattened tube having an inner ply of thermoplastic material, said bag having a diamond fold bottom including flaps providing confronting flap edges, said diamond fold having a central heat-sealed seam along said flap edges and transverse heat seals adjacent both sides of the ultimate bag bottom, and a bead of additional thermoplastic material deposited along the jointure of the inner of said flap edges for filling any opening where said transverse heat seals cross said central seam.

2. A bag as characterized in claim 1 and wherein said flap edges are interleaved.

3. A bag as characterized in claim 1 and wherein said central heat-sealed seam is a fin seam formed by face-to-face contact of the inner surfaces of said inner flap edges.

4. A bag as characterized in claim 3 and wherein the outer of said flap edges are interleaved and adhesively secured over the flattened down fin seam.

5. A bag comprising a length of flattened tube having at least a thermoplastic inside surface and a bottom including flaps providing flap edges in surface to surface engagement, said bottom having a heat-sealed seam along said flap edges and transverse heat seals extending crosswise of said edges, and a bead of additional thermoplastic material extending lengthwise of said edges along an inner part of the bag bottom.

6. A bag comprising a length of flattened tube having at least a thermoplastic inside surface and a bottom including flaps providing flap edges in surface to surface engagement, said bottom having a heat-sealed fin type seam along said flap edges and transverse heat seals extending crosswise of said edges, and a bead of additional thermoplastic material extending lengthwise of said edges in the crotch of said fin type seam.

7. A bag comprising a length of flattened tube having at least a thermoplastic inside surface and a bottom including flaps providing flap edges in surface to surface overlapped engagement, said bottom having a heat-sealed seam along said overlapped flap edges and transverse heat seals extending crosswise of said edges, and a bead of additional thermoplastic material extending lengthwise of such flap edges along the end of an inner of said overlapped flap edges.

8. A bag comprising a length of flattened tube of a plurality of plies the inner one of which has a thermoplastic inside surface and a bottom including flaps providing flap edges in surface to surface engagement, said bottom having a heat-sealed fin type seam along said flap edges and transverse heat seals extending crosswise of said edges, and a bead of thermoplastic material applied to said inside surface and extending lengthwise of said edges in the crotch of said fin type seam.

9. A bag comprising a length of flattened tube of a plurality of plies the inner one of which has a thermoplastic inside surface and a bottom including flaps providing flap edges in surface to surface overlapped and interleaved engagement, said bottom having a heat sealed seam along said overlapped flap edges and transverse heat seals extending crosswise of said edges, and a bead of thermoplastic material extending lengthwise of said flap edges along the end of an inner of said overlapped and interleaved flap edges.

10. A method of sealing the bottom closures of bags having at least a thermoplastic inside surface wherein such bottom closures are each formed with flaps providing flap edges in surface to surface engagement and extending across said bottom to form a heat sealed seam comprising: arranging the flap edges in said surface to surface engagement, sealing the edges together and applying a thermoplastic adhesive lengthwise of such edges along an inner part of the bag bottom, and subsequently heat sealing said bag bottom along spaced apart locations extending crosswise of said sealed edges.

11. The method of claim 10 wherein said flap edges are arranged to provide a fin type seam, and said thermoplastic adhesive is applied in the crotch of such fin.

12. The method of claim 10 wherein said flap edges are arranged to provide an overlapped type seam, and said thermoplastic adhesive is applied along an end of an inner flap edge.

13. A method of sealing the bottom closures of bags having at least a thermoplastic inside surface wherein such bottoms have confronting overlapping flap edges extending across said bottom comprising: arranging such flap edges so that one of them is upright and an inner flap edge lies substantially in the plane of the bottom, applying a thermoplastic adhesive lengthwise of such edges along an inner part of the bag bottom, sealing such edges together, and subsequently heat sealing said bag bottom along spaced apart locations extending crosswise of said sealed edges.

14. A method of sealing the bottom closures of bags having at least a thermoplastic inside surface wherein such bottom closures are each formed by a diamond fold providing outwardly extending flaps having confronting overlapping edges extending across said bottom comprising arranging such flap edges so that one of them is upright and an inner flap edge lies substantially in the plane of the bottom, applying thermoplastic adhesive along the outer surface and end of such inner flap edge to prevent wicking through said end when the bag bottom is sealed and the bag is subsequently filled with material, sealing such edges together, and subsequently heat sealing said bag bottom along spaced apart locations extending crosswise of said sealed edges.

References Cited by the Examiner

UNITED STATES PATENTS

| | | | |
|---|---|---|---|
| 2,353,402 | 7/44 | Haslacher | 93—35 |
| 2,501,852 | 3/50 | Ringler | 229—37 |
| 2,537,462 | 1/51 | Haslacher | 93—35 |
| 2,709,549 | 5/55 | Haslacher | 229—55 |
| 2,751,140 | 6/56 | Brady | 229—55 |

FRANKLIN T. GARRETT, *Primary Examiner.*